(12) United States Patent
Ng et al.

(10) Patent No.: US 12,445,947 B2
(45) Date of Patent: Oct. 14, 2025

(54) INITIAL CELL SEARCH PROCEDURE

(71) Applicant: NOKIA TECHNOLOGIES OY, Espoo (FI)

(72) Inventors: Man Hung Ng, Swindon (GB); Hisashi Onozawa, Tokyo (JP); Kari Juhani Hooli, Oulu (FI); Sami-Jukka Hakola, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/931,665

(22) Filed: Oct. 30, 2024

(65) Prior Publication Data

US 2025/0056391 A1 Feb. 13, 2025

Related U.S. Application Data

(63) Continuation of application No. PCT/IB2024/051387, filed on Feb. 14, 2024.

(60) Provisional application No. 63/446,394, filed on Feb. 17, 2023.

(51) Int. Cl.
*H04W 48/16* (2009.01)
(52) U.S. Cl.
CPC .................. *H04W 48/16* (2013.01)
(58) Field of Classification Search
CPC .......................... H04W 48/16; H04J 11/0069
USPC ....................................................... 455/434
See application file for complete search history.

(56) References Cited

U.S. PATENT DOCUMENTS

2019/0222340 A1 7/2019 Kaikkonen et al.
2020/0228222 A1* 7/2020 Chiang ................ H04W 48/16

FOREIGN PATENT DOCUMENTS

WO 2021/217503 A1 11/2021

OTHER PUBLICATIONS

International Search Report and Written Opinion dated Apr. 29, 2024 corresponding to International Patent Application No. PCT/IB2024/051387.
Nokia et al., "Synchronization raster design for n100," 3GPP Draft; R4-2206049, 3GPP TSG-RAN WG4 Meeting #102-e, Electronic meeting, Feb. 21-Mar. 3, 2022, Feb. 14, 2022, XP052113022.
Nokia et al., "NR support for below 5 MHz BW," 3GPP Draft; R1-2212397, 3GPP TSG RAN WG1 #111, Toulouse, France, Nov. 14-18, 2022, Nov. 7, 2022, XP052222956.

* cited by examiner

*Primary Examiner* — Chuck Huynh
(74) *Attorney, Agent, or Firm* — SQUIRE PATTON BOGGS (US) LLP

(57) ABSTRACT

There is provided a user equipment apparatus that includes at least one processor and at least one memory. The memory stores instructions which, when executed by the at least one processor, cause the user equipment apparatus at least to perform an initial cell search of one or more cells on a network. A synchronization raster includes a cluster of three raster points positioned every 600 kHz.

15 Claims, 15 Drawing Sheets

| Channel Raster | | Synchronization Raster (5 MHz) | | | | | | | | | |
|---|---|---|---|---|---|---|---|---|---|---|---|
| | Channel Edges | | 2300 920.45 | 2301 920.55 | 2302 920.65 | 2303 921.65 | 2304 921.75 | 2305 921.85 | 2306 922.85 | 2307 922.95 | 2308 923.05 |
| 920.9 | 919.4 | 922.4 | -0.45 | -0.35 | -0.25 | 0.75 | 0.85 | 0.95 | 1.95 | 2.05 | 2.15 |
| 921 | 919.5 | 922.5 | -0.55 | -0.45 | -0.35 | 0.65 | 0.75 | 0.85 | 1.85 | 1.95 | 2.05 |
| 921.1 | 919.6 | 922.6 | -0.65 | -0.55 | -0.45 | 0.55 | 0.65 | 0.75 | 1.75 | 1.85 | 1.95 |
| 921.2 | 919.7 | 922.7 | -0.75 | -0.65 | -0.55 | 0.45 | 0.55 | 0.65 | 1.65 | 1.75 | 1.85 |
| 921.3 | 919.8 | 922.8 | -0.85 | -0.75 | -0.65 | 0.35 | 0.45 | 0.55 | 1.55 | 1.65 | 1.75 |
| 921.4 | 919.9 | 922.9 | -0.95 | -0.85 | -0.75 | 0.25 | 0.35 | 0.45 | 1.45 | 1.55 | 1.65 |
| 921.5 | 920 | 923 | -1.05 | -0.95 | -0.85 | 0.15 | 0.25 | 0.35 | 1.35 | 1.45 | 1.55 |
| 921.6 | 920.1 | 923.1 | -1.15 | -1.05 | -0.95 | 0.05 | 0.15 | 0.25 | 1.25 | 1.35 | 1.45 |
| 921.7 | 920.2 | 923.2 | -1.25 | -1.15 | -1.05 | -0.05 | 0.05 | 0.15 | 1.15 | 1.25 | 1.35 |
| 921.8 | 920.3 | 923.3 | -1.35 | -1.25 | -1.15 | -0.15 | -0.05 | 0.05 | 1.05 | 1.15 | 1.25 |
| 921.9 | 920.4 | 923.4 | -1.45 | -1.35 | -1.25 | -0.25 | -0.15 | -0.05 | 0.95 | 1.05 | 1.15 |
| 922 | 920.5 | 923.5 | -1.55 | -1.45 | -1.35 | -0.35 | -0.25 | -0.15 | 0.85 | 0.95 | 1.05 |
| 922.1 | 920.6 | 923.6 | -1.65 | -1.55 | -1.45 | -0.45 | -0.35 | -0.25 | 0.75 | 0.85 | 0.95 |
| 922.2 | 920.7 | 923.7 | -1.75 | -1.65 | -1.55 | -0.55 | -0.45 | -0.35 | 0.65 | 0.75 | 0.85 |

FIG. 6A

| | | | | | | | | | | | |
|---|---|---|---|---|---|---|---|---|---|---|---|
| 922.3 | 920.8 | 923.8 | -1.85 | -1.75 | -1.65 | -0.65 | -0.55 | -0.45 | 0.55 | 0.65 | 0.75 |
| 922.4 | 920.9 | 923.9 | -1.95 | -1.85 | -1.75 | -0.75 | -0.65 | -0.55 | 0.45 | 0.55 | 0.65 |
| 922.5 | 921 | 924 | -2.05 | -1.95 | -1.85 | -0.85 | -0.75 | -0.65 | 0.35 | 0.45 | 0.55 |
| 922.6 | 921.1 | 924.1 | -2.15 | -2.05 | -1.95 | -0.95 | -0.85 | -0.75 | 0.25 | 0.35 | 0.45 |
| 922.7 | 921.2 | 924.2 | -2.25 | -2.15 | -2.05 | -1.05 | -0.95 | -0.85 | 0.15 | 0.25 | 0.35 |
| 922.8 | 921.3 | 924.3 | -2.35 | -2.25 | -2.15 | -1.15 | -1.05 | -0.95 | 0.05 | 0.15 | 0.25 |
| 922.9 | 921.4 | 924.4 | -2.45 | -2.35 | -2.25 | -1.25 | -1.15 | -1.05 | -0.05 | 0.05 | 0.15 |
| 923 | 921.5 | 924.5 | -2.55 | -2.45 | -2.35 | -1.35 | -1.25 | -1.15 | -0.15 | -0.05 | 0.05 |
| 923.1 | 921.6 | 924.6 | -2.65 | -2.55 | -2.45 | -1.45 | -1.35 | -1.25 | -0.25 | -0.15 | -0.05 |
| 923.2 | 921.7 | 924.7 | -2.75 | -2.65 | -2.55 | -1.55 | -1.45 | -1.35 | -0.35 | -0.25 | -0.15 |
| 923.3 | 921.8 | 924.8 | -2.85 | -2.75 | -2.65 | -1.65 | -1.55 | -1.45 | -0.45 | -0.35 | -0.25 |
| 923.4 | 921.9 | 924.9 | -2.95 | -2.85 | -2.75 | -1.75 | -1.65 | -1.55 | -0.55 | -0.45 | -0.35 |
| 923.5 | 922 | 925 | -3.05 | -2.95 | -2.85 | -1.85 | -1.75 | -1.65 | -0.65 | -0.55 | -0.45 |

FIG. 6B

| Channel Raster | Channel Edges | | Synchronization Raster (3 MHz) | | | | | | | | | |
|---|---|---|---|---|---|---|---|---|---|---|---|---|
| | | | 2301.5 | 2302.5 | 2303.5 | 2304.5 | 2305.5 | 2306.5 | 2307.5 | 2308.5 | 2309.5 |
| | | | 921.05 | 921.15 | 921.25 | 922.25 | 922.35 | 922.45 | 923.45 | 923.55 | 923.65 |
| 920.9 | 919.4 | 922.4 | 0.15 | 0.25 | 0.35 | 1.35 | 1.45 | 1.55 | 2.55 | 2.65 | 2.75 |
| 921 | 919.5 | 922.5 | 0.05 | 0.15 | 0.25 | 1.25 | 1.35 | 1.45 | 2.45 | 2.55 | 2.65 |
| 921.1 | 919.6 | 922.6 | -0.05 | 0.05 | 0.15 | 1.15 | 1.25 | 1.35 | 2.35 | 2.45 | 2.55 |
| 921.2 | 919.7 | 922.7 | -0.15 | -0.05 | 0.05 | 1.05 | 1.15 | 1.25 | 2.25 | 2.35 | 2.45 |
| 921.3 | 919.8 | 922.8 | -0.25 | -0.15 | -0.05 | 0.95 | 1.05 | 1.15 | 2.15 | 2.25 | 2.35 |
| 921.4 | 919.9 | 922.9 | -0.35 | -0.25 | -0.15 | 0.85 | 0.95 | 1.05 | 2.05 | 2.15 | 2.25 |
| 921.5 | 920 | 923 | -0.45 | -0.35 | -0.25 | 0.75 | 0.85 | 0.95 | 1.95 | 2.05 | 2.15 |
| 921.6 | 920.1 | 923.1 | -0.55 | -0.45 | -0.35 | 0.65 | 0.75 | 0.85 | 1.85 | 1.95 | 2.05 |
| 921.7 | 920.2 | 923.2 | -0.65 | -0.55 | -0.45 | 0.55 | 0.65 | 0.75 | 1.75 | 1.85 | 1.95 |
| 921.8 | 920.3 | 923.3 | -0.75 | -0.65 | -0.55 | 0.45 | 0.65 | 0.65 | 1.65 | 1.75 | 1.85 |
| 921.9 | 920.4 | 923.4 | -0.85 | -0.75 | -0.65 | 0.35 | 0.45 | 0.55 | 1.55 | 1.65 | 1.75 |
| 922 | 920.5 | 923.5 | -0.95 | -0.85 | -0.75 | 0.25 | 0.35 | 0.45 | 1.45 | 1.55 | 1.65 |

FIG. 7A

| 922.1 | 920.6 | 923.6 | -1.05 | -0.95 | -0.85 | 0.15 | 0.25 | 0.35 | 1.35 | 1.45 | 1.55 |
|---|---|---|---|---|---|---|---|---|---|---|---|
| 922.2 | 920.7 | 923.7 | -1.15 | -1.05 | -0.95 | 0.05 | 0.15 | 0.25 | 1.25 | 1.35 | 1.45 |
| 922.3 | 920.8 | 923.8 | -1.25 | -1.15 | -1.05 | -0.05 | 0.05 | 0.15 | 1.15 | 1.25 | 1.35 |
| 922.4 | 920.9 | 923.9 | -1.35 | -1.25 | -1.15 | -0.15 | 0.05 | 0.05 | 1.05 | 1.15 | 1.25 |
| 922.5 | 921 | 924 | -1.45 | -1.35 | -1.25 | -0.25 | -0.15 | -0.05 | 0.95 | 1.05 | 1.15 |
| 922.6 | 921.1 | 924.1 | -1.55 | -1.45 | -1.35 | -0.35 | -0.25 | -0.15 | 0.85 | 0.95 | 1.05 |
| 922.7 | 921.2 | 924.2 | -1.65 | -1.55 | -1.45 | -0.45 | -0.35 | -0.25 | 0.75 | 0.85 | 0.95 |
| 922.8 | 921.3 | 924.3 | -1.75 | -1.65 | -1.55 | -0.55 | -0.45 | -0.35 | 0.65 | 0.75 | 0.85 |
| 922.9 | 921.4 | 924.4 | -1.85 | -1.75 | -1.65 | -0.65 | -0.55 | -0.45 | 0.55 | 0.65 | 0.75 |
| 923 | 921.5 | 924.5 | -1.95 | -1.85 | -1.75 | -0.75 | -0.65 | -0.55 | 0.45 | 0.55 | 0.65 |
| 923.1 | 921.6 | 924.6 | -2.05 | -1.95 | -1.85 | -0.85 | -0.75 | -0.65 | 0.35 | 0.45 | 0.55 |
| 923.2 | 921.7 | 924.7 | -2.15 | -2.05 | -1.95 | -0.95 | -0.85 | -0.75 | 0.25 | 0.35 | 0.45 |
| 923.3 | 921.8 | 924.8 | -2.25 | -2.15 | -2.05 | -1.05 | -0.95 | -0.85 | 0.15 | 0.25 | 0.35 |
| 923.4 | 921.9 | 924.9 | -2.35 | -2.25 | -2.15 | -1.15 | -1.05 | -0.95 | 0.05 | 0.15 | 0.25 |
| 923.5 | 922 | 925 | -2.45 | -2.35 | -2.25 | -1.25 | -1.15 | -1.05 | -0.05 | 0.05 | 0.15 |

FIG. 7B

| | | | Synchronization Raster (5 MHz) | | | | | | | | |
|---|---|---|---|---|---|---|---|---|---|---|---|
| | | | 2300.1 | 2301.1 | 2302.1 | 2303.1 | 2304.1 | 2305.1 | 2306.1 | 2307.1 | 2308.1 |
| Channel Raster | Channel Edges | | 920.57 | 920.67 | 920.77 | 921.77 | 921.87 | 921.97 | 923.97 | 923.07 | 923.17 |
| 920.9 | 919.4 | 922.4 | -0.33 | -0.23 | -0.13 | 0.87 | 0.97 | 1.07 | 2.07 | 2.17 | 2.27 |
| 921 | 919.5 | 922.5 | -0.43 | -0.33 | -0.23 | 0.77 | 0.87 | 0.97 | 1.97 | 2.07 | 2.17 |
| 921.1 | 919.6 | 922.6 | -0.53 | -0.43 | -0.33 | 0.67 | 0.77 | 0.87 | 1.87 | 1.97 | 2.07 |
| 921.2 | 919.7 | 922.7 | -0.63 | -0.53 | -0.43 | 0.57 | 0.67 | 0.77 | 1.77 | 1.87 | 1.97 |
| 921.3 | 919.8 | 922.8 | -0.73 | -0.63 | -0.53 | 0.47 | 0.57 | 0.67 | 1.67 | 1.77 | 1.87 |
| 921.4 | 919.9 | 922.9 | -0.83 | -0.73 | -0.63 | 0.37 | 0.47 | 0.57 | 1.57 | 1.67 | 1.77 |
| 921.5 | 920 | 923 | -0.93 | -0.83 | -0.73 | 0.27 | 0.37 | 0.47 | 1.47 | 1.57 | 1.67 |
| 921.6 | 920.1 | 923.1 | -1.03 | -0.93 | -0.83 | 0.17 | 0.27 | 0.37 | 1.37 | 1.47 | 1.57 |
| 921.7 | 920.2 | 923.2 | -1.13 | -1.03 | -0.93 | 0.07 | 0.17 | 0.27 | 1.27 | 1.37 | 1.47 |
| 921.8 | 920.3 | 923.3 | -1.23 | -1.13 | -1.03 | -0.03 | 0.07 | 0.17 | 1.17 | 1.27 | 1.37 |
| 921.9 | 920.4 | 923.4 | -1.33 | -1.23 | -1.13 | -0.13 | -0.03 | 0.07 | 1.07 | 1.17 | 1.27 |
| 922 | 920.5 | 923.5 | -1.43 | -1.33 | -1.23 | -0.23 | -0.13 | -0.03 | 0.97 | 1.07 | 1.17 |

FIG. 8A

| 922.1 | 920.6 | 923.6 | -1.53 | -1.43 | -1.33 | -0.33 | -0.23 | -0.13 | 0.87 | 0.97 | 1.07 |
|---|---|---|---|---|---|---|---|---|---|---|---|
| 922.2 | 920.7 | 923.7 | -1.63 | -1.53 | -1.43 | -0.43 | -0.33 | -0.23 | 0.77 | 0.87 | 0.97 |
| 922.3 | 920.8 | 923.8 | -1.73 | -1.63 | -1.53 | -0.53 | -0.43 | -0.33 | 0.67 | 0.77 | 0.87 |
| 922.4 | 920.9 | 923.9 | -1.83 | -1.73 | -1.63 | -0.63 | -0.53 | -0.43 | 0.57 | 0.67 | 0.77 |
| 922.5 | 921 | 924 | -1.93 | -1.83 | -1.73 | -0.73 | -0.63 | -0.53 | 0.47 | 0.57 | 0.67 |
| 922.6 | 921.1 | 924.1 | -2.03 | -1.93 | -1.83 | -0.83 | -0.73 | -0.63 | 0.37 | 0.47 | 0.57 |
| 922.7 | 921.2 | 924.2 | -2.13 | -2.03 | -1.93 | -0.93 | -0.83 | -0.73 | 0.27 | 0.37 | 0.47 |
| 922.8 | 921.3 | 924.3 | -2.23 | -2.13 | -2.03 | -1.03 | -0.93 | -0.83 | 0.17 | 0.27 | 0.37 |
| 922.9 | 921.4 | 924.4 | -2.33 | -2.23 | -2.13 | -1.13 | -1.03 | -0.93 | 0.07 | 0.17 | 0.27 |
| 923 | 921.5 | 924.5 | -2.43 | -2.33 | -2.23 | -1.23 | -1.13 | -1.03 | -0.03 | 0.07 | 0.17 |
| 923.1 | 921.6 | 924.6 | -2.53 | -2.43 | -2.33 | -1.33 | -1.23 | -1.13 | -0.13 | -0.03 | 0.07 |
| 923.2 | 921.7 | 924.7 | -2.63 | -2.53 | -2.43 | -1.43 | -1.33 | -1.23 | -0.23 | -0.13 | -0.03 |
| 923.3 | 921.8 | 924.8 | -2.73 | -2.63 | -2.53 | -1.53 | -1.43 | -1.33 | -0.33 | -0.23 | -0.13 |
| 923.4 | 921.9 | 924.9 | -2.83 | -2.73 | -2.63 | -1.63 | -1.53 | -1.43 | -0.43 | -0.33 | -0.23 |
| 923.5 | 922 | 925 | -2.93 | -2.83 | -2.73 | -1.73 | -1.63 | -1.53 | -0.53 | -0.43 | -0.33 |

FIG. 8B

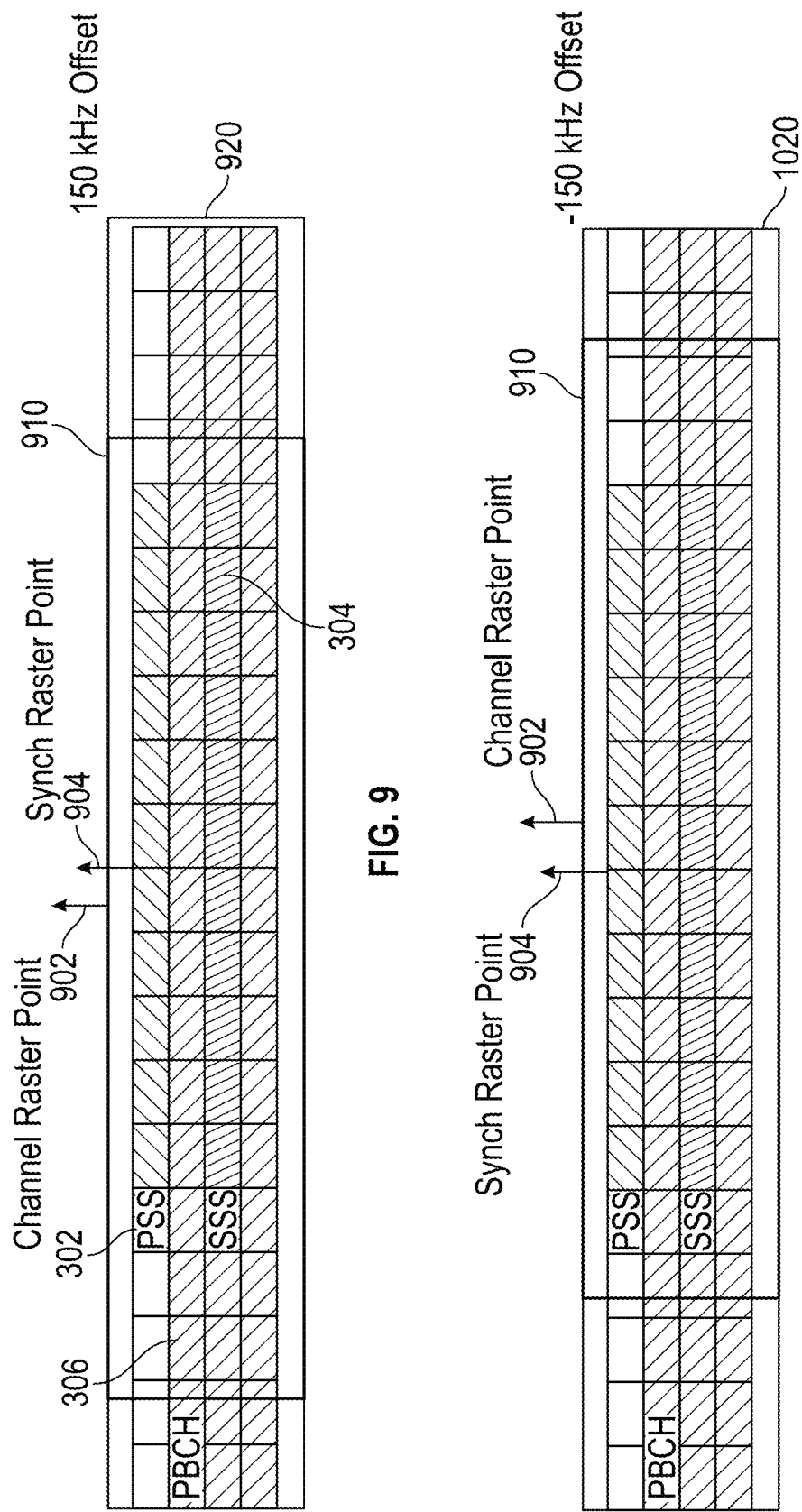

| Channel Raster [MHz] | 921.17 | 921.27 | 921.37 | 921.77 | 921.87 | 921.97 | 922.37 | 922.47 | 922.57 | 922.97 | 923.07 | 923.17 | 923.57 | 923.67 | 923.77 |
|---|---|---|---|---|---|---|---|---|---|---|---|---|---|---|---|
| 920.9 | 0.27 | 0.37 | 0.47 | 0.87 | 0.97 | 1.07 | 1.47 | 1.57 | 1.67 | 2.07 | 2.17 | 2.27 | 2.67 | 2.77 | 2.87 |
| 921 | 0.17 | 0.27 | 0.37 | 0.77 | 0.87 | 0.97 | 1.37 | 1.47 | 1.57 | 1.97 | 2.07 | 2.17 | 2.57 | 2.67 | 2.77 |
| 921.1 | 0.07 | 0.17 | 0.27 | 0.67 | 0.77 | 0.87 | 1.27 | 1.37 | 1.47 | 1.87 | 1.97 | 2.07 | 2.47 | 2.57 | 2.67 |
| 921.2 | -0.03 | 0.07 | 0.17 | 0.57 | 0.67 | 0.77 | 1.17 | 1.27 | 1.37 | 1.77 | 1.87 | 1.97 | 2.37 | 2.47 | 2.57 |
| 921.3 | -0.13 | -0.03 | 0.07 | 0.47 | 0.57 | 0.67 | 1.07 | 1.17 | 1.27 | 1.67 | 1.77 | 1.87 | 2.27 | 2.37 | 2.47 |
| 921.4 | -0.23 | -0.13 | -0.03 | 0.37 | 0.47 | 0.57 | 0.97 | 1.07 | 1.17 | 1.57 | 1.67 | 1.77 | 2.17 | 2.27 | 2.37 |
| 921.5 | -0.33 | -0.23 | -0.13 | 0.27 | 0.37 | 0.47 | 0.87 | 0.97 | 1.07 | 1.47 | 1.57 | 1.67 | 2.07 | 2.17 | 2.27 |
| 921.6 | -0.43 | -0.33 | -0.23 | 0.17 | 0.27 | 0.37 | 0.77 | 0.87 | 0.97 | 1.37 | 1.47 | 1.57 | 1.97 | 2.07 | 2.17 |
| 921.7 | -0.53 | -0.43 | -0.33 | 0.07 | 0.17 | 0.27 | 0.67 | 0.77 | 0.87 | 1.27 | 1.37 | 1.47 | 1.87 | 1.97 | 2.07 |
| 921.8 | -0.63 | -0.53 | -0.43 | -0.03 | 0.07 | 0.17 | 0.57 | 0.67 | 0.77 | 1.17 | 1.27 | 1.37 | 1.77 | 1.87 | 1.97 |
| 921.9 | -0.73 | -0.63 | -0.53 | -0.13 | -0.03 | 0.07 | 0.47 | 0.57 | 0.67 | 1.07 | 1.17 | 1.27 | 1.67 | 1.77 | 1.87 |
| 922 | -0.83 | -0.73 | -0.63 | -0.23 | -0.13 | -0.03 | 0.37 | 0.47 | 0.57 | 0.97 | 1.07 | 1.17 | 1.57 | 1.67 | 1.77 |
| 922.1 | -0.93 | -0.83 | -0.73 | -0.33 | -0.23 | -0.13 | 0.27 | 0.37 | 0.47 | 0.87 | 0.97 | 1.07 | 1.47 | 1.57 | 1.67 |

Synchronization Raster [MHZ] (For 3 MHz BW)

FIG. 13A

| | | | | | | | | | | | | | | | |
|---|---|---|---|---|---|---|---|---|---|---|---|---|---|---|---|
| 922.2 | -1.03 | -0.93 | -0.83 | -0.43 | -0.33 | -0.23 | 0.17 | 0.27 | 0.37 | 0.77 | 0.87 | 0.97 | 1.37 | 1.47 | 1.57 |
| 922.3 | -1.13 | -1.03 | -0.93 | -0.53 | -0.43 | -0.33 | 0.07 | 0.17 | 0.27 | 0.67 | 0.77 | 0.87 | 1.27 | 1.37 | 1.47 |
| 922.4 | -1.23 | -1.13 | -1.03 | -0.63 | -0.53 | -0.43 | -0.03 | 0.07 | 0.17 | 0.57 | 0.67 | 0.77 | 1.17 | 1.27 | 1.37 |
| 922.5 | -1.33 | -1.23 | -1.13 | -0.73 | -0.63 | -0.53 | -0.13 | -0.03 | 0.07 | 0.47 | 0.57 | 0.67 | 1.07 | 1.17 | 1.27 |
| 922.6 | -1.43 | -1.33 | -1.23 | -0.83 | -0.73 | -0.63 | -0.23 | -0.13 | -0.03 | 0.37 | 0.47 | 0.57 | 0.97 | 1.07 | 1.17 |
| 922.7 | -1.53 | -1.43 | -1.33 | -0.93 | -0.83 | -0.73 | -0.33 | -0.23 | -0.13 | 0.27 | 0.37 | 0.47 | 0.87 | 0.97 | 1.07 |
| 922.8 | -1.63 | -1.53 | -1.43 | -1.03 | -0.93 | -0.83 | -0.43 | -0.33 | -0.23 | 0.17 | 0.27 | 0.37 | 0.77 | 0.87 | 0.97 |
| 922.9 | -1.73 | -1.63 | -1.53 | -1.13 | -1.03 | -0.93 | -0.53 | -0.43 | -0.33 | 0.07 | 0.17 | 0.27 | 0.67 | 0.77 | 0.87 |
| 923 | -1.83 | -1.73 | -1.63 | -1.23 | -1.13 | -1.03 | -0.63 | -0.53 | -0.43 | -0.03 | 0.07 | 0.17 | 0.57 | 0.67 | 0.77 |
| 923.1 | -1.93 | -1.83 | -1.73 | -1.33 | -1.23 | -1.13 | -0.73 | -0.63 | -0.53 | -0.13 | -0.03 | 0.07 | 0.47 | 0.57 | 0.67 |
| 923.2 | -2.03 | -1.93 | -1.83 | -1.43 | -1.33 | -1.23 | -0.83 | -0.73 | -0.63 | -0.23 | -0.13 | -0.03 | 0.37 | 0.47 | 0.57 |
| 923.3 | -2.13 | -2.03 | -1.93 | -1.53 | -1.43 | -1.33 | -0.93 | -0.83 | -0.73 | -0.33 | -0.23 | -0.13 | 0.27 | 0.37 | 0.47 |
| 923.4 | -2.23 | -2.13 | -2.03 | -1.63 | -1.53 | -1.43 | -1.03 | -0.93 | -0.83 | -0.43 | -0.33 | -0.23 | 0.17 | 0.27 | 0.37 |
| 923.5 | -2.33 | -2.23 | -2.13 | -1.73 | -1.63 | -1.53 | -1.13 | -1.03 | -0.93 | -0.53 | -0.43 | -0.33 | 0.07 | 0.17 | 0.27 |

FIG. 13B

INITIAL CELL SEARCH PROCEDURE

RELATED APPLICATION

This application is a Continuation of International Patent Application No. PCT/IB2024/051387 filed Feb. 14, 2024, and which claims priority from U.S. Provisional Application No. 63/446,394, filed Feb. 17, 2023, the disclosures of which are hereby incorporated by reference in their entirety.

FIELD

Various example embodiments relate generally to wireless networking and, more particularly, to access procedures in wireless networking

BACKGROUND

Wireless networking provides significant advantages for user mobility. A users' ability to remain connected while on the move provides advantages not only for the user, but also provides greater efficiency and productivity for society as a whole. As user expectations for connection reliability, data speed, and device battery life, become more demanding, technology for wireless networking must also keep pace with such expectations. Accordingly, there is continuing interest in improving wireless networking technology.

SUMMARY

In accordance with aspects of the disclosure, a user equipment apparatus includes at least one processor and at least one memory. The at least one memory stores instructions which, when executed by the at least one processor, cause the user equipment apparatus at least to perform an initial cell search of one or more cells on a network, wherein performing the initial cell search includes scanning through a plurality of synchronization signal block (SSB) entries with a synchronization raster. The synchronization raster includes a cluster of three raster points positioned every 600 kHz.

In an aspect of the present disclosure, the synchronization raster points in each cluster may include frequency offsets from each other of 50 kHz, 150 kHz, and/or 250 kHz, apart from the 600 kHz.

In an aspect of the present disclosure, a range of synchronization raster points to be scanned may start at 120 kHz from an existing synchronization raster point to avoid overlapping with existing synchronization raster points valid for other existing channel bandwidth.

In an aspect of the present disclosure, in the case that the user equipment apparatus supports both a 3 MHz channel bandwidth and a 5 MHz channel bandwidth, the instructions, when executed by the at least one processor, may further cause the user equipment apparatus to scan through a first range of the plurality of SSB entries, where a first range of synchronization raster points is given by: (N*1200 kHz)+(M*50 kHz), scan through a second range of the plurality of SSB entries, where a second range of synchronization raster points is given by: 600 kHz+(N*1200 kHz)+(M*50 kHz), and scan through a third range of the plurality of SSB entries, where a third range of synchronization raster points is given by: 120 kHz+(N*1200 kHz)+(M*50 kHz), where values of N range from 1 to 2499, and values of M are 1, 3, and 5.

In an aspect of the present disclosure, in the case that the user equipment apparatus supports a 3 MHz channel bandwidth, the instructions, when executed by the at least one processor, may further cause the user equipment apparatus to scan through a second range of the plurality of SSB entries, where a second range of synchronization raster points is given by: 600 kHz+(N*1200 kHz)+(M*50 kHz), and scan through a third range of the plurality of SSB entries, where a third range of synchronization raster points is given by: 120 kHz+(N*1200 kHz)+(M*50 kHz), where values of N range from 1 to 2499, and values of M are 1, 3, and 5.

In an aspect of the present disclosure, for synchronization raster points in the first range of the plurality of SSB entries, the instructions, when executed by the at least one processor, may further cause the user equipment apparatus to apply twenty physical resource block (PRB) unpunctured allocations for a physical broadcast channel (PBCH).

In an aspect of the present disclosure, for synchronization raster points in the second range or third range of the plurality of SSB entries, the instructions, when executed by the at least one processor, may further cause the user equipment apparatus to apply a plurality of PRB allocations for one or more puncturing patterns.

In an aspect of the present disclosure, in the case that the user equipment apparatus supports both a 3 MHz channel bandwidth and a 5 MHz channel bandwidth, the instructions when executed by the at least one processor, may further cause the user equipment apparatus to search the synchronization raster points which are 600 kHz and 120 kHz higher than the synchronization raster points in the first range of synchronization raster points.

In an aspect of the present disclosure, in the case that the user equipment apparatus supports both a 3 MHz channel bandwidth and a 5 MHz channel bandwidth, the instructions when executed by the at least one processor, may further cause the user equipment apparatus to: search the first range of synchronization raster points for the SSB, determine if the SSB is within the first range of synchronization raster points, and search the second range and third ranges of synchronization raster points based on the determination that the SSB is not located in the first range.

In an aspect of the present disclosure, in the case that the user equipment apparatus supports both a 3 MHz channel bandwidth and a 5 MHz channel bandwidth, the instructions, when executed by the at least one processor, may further cause the user equipment apparatus to search the first range of synchronization raster points and the second and third ranges of synchronization raster points together with an ascending order or a descending order in a frequency domain.

In an aspect of the present disclosure, in the case that the user equipment apparatus supports a 3 MHz channel bandwidth, the instructions, when executed by the at least one processor, may further cause the user equipment apparatus to scan through a second range of the plurality of SSB entries, where a second range of synchronization raster points is given by: 120 KHz+(N*600 kHz)+(M*50 kHz), where for the second range the values of N range from 2 to 4999, and the values of M are 1, 3, and 5.

In accordance with aspects of the disclosure, a method in a user equipment apparatus is presented. The method includes performing an initial cell search of one or more cells on a network, wherein performing the initial cell search includes scanning through a plurality of SSB entries with a synchronization raster. The synchronization raster includes a cluster of three synchronization raster points positioned every 600 kHz.

In an aspect of the present disclosure, the synchronization raster points may include frequency offsets from each other of 50 kHz, 150 kHz, and/or 250 kHz, apart from the 600 kHz.

In an aspect of the present disclosure, a range of synchronization raster points to be scanned may start at 120 kHz from an existing synchronization raster point to avoid overlapping with existing synchronization raster points valid for other existing channel bandwidth.

In an aspect of the present disclosure, in the case that the user equipment apparatus supports both a 3 MHz channel bandwidth and a 5 MHz channel bandwidth, the scanning may include scanning through a first range of the plurality of SSB entries, where a first range of synchronization raster points is given by (N*1200 kHz)+(M*50 kHz), scanning through a second range of the plurality of SSB entries, where a second range of synchronization raster points is given by 600 kHz+(N*1200 kHz)+(M*50 kHz); and scanning through a third range of the plurality of SSB entries, where a third range of synchronization raster points is given by: 120 KHz+(N*1200 kHz)+(M*50 kHz), where the values of N range from 1 to 2499, and the values of M are 1, 3, and 5.

In an aspect of the present disclosure, in the case that the user equipment apparatus supports a 3 MHz channel bandwidth, the scanning may include scanning through a second range of the plurality of SSB entries, where a second range of synchronization raster points is given by 600 KHz+(N*1200 kHz)+(M*50 kHz); and scanning through a third range of the plurality of SSB entries, where a third range of synchronization raster points is given by: 120 kHz+(N*1200 kHz)+(M*50 kHz), where the values of N range from 1 to 2499, and the values of M are 1, 3, and 5.

In an aspect of the present disclosure, in the case that the user equipment apparatus supports a 3 MHz channel bandwidth, the scanning may include scanning through a second range of the plurality of SSB entries, where a second range of synchronization raster points is given by: 120 KHz+(N*600 kHz)+(M*50 kHz), where for the second range the values of N range from 2 to 4999, and the values of M are 1, 3, and 5.

In accordance with aspects of the disclosure, one or more non-transitory processor-readable media storing instructions which, when executed by one or more processors, cause a user equipment apparatus to perform an initial cell search of one or more cells on a network, wherein performing the initial cell search includes, in the case that the user equipment apparatus supports both a 3 MHz channel bandwidth and a 5 MHz channel bandwidth, scanning through a plurality of SSB entries with a synchronization raster by scanning through a first range of the plurality of SSB entries, where a first range of synchronization raster points is given by (N*1200 kHz)+(M*50 kHz), where values of N range from 1 to 2499, and values of M are 1, 3, and 5.

In an aspect of the present disclosure, in the case that the user equipment apparatus supports a 3 MHz channel bandwidth, the scanning may further include: scanning through a second range of the plurality of SSB entries, where a second range of synchronization raster points is given by 600 KHz+(N*1200 kHz)+(M*50 kHz); and scanning through a third range of the plurality of SSB entries, where a third range of synchronization raster points is given by 120 KHz+(N*1200 kHz)+(M*50 kHz), wherein the values of N range from 1 to 2499, and the values of M are 1, 3, and 5.

In an aspect of the present disclosure, in the case that the user equipment apparatus supports a 3 MHz channel bandwidth, the scanning may further include scanning through a second range of the plurality of SSB entries, where a second range of synchronization raster points is given by 120 KHz+(N*600 kHz)+(M*50 kHz), where for the second range the values of N range from 2 to 4999, and the values of M are 1, 3, and 5.

According to some aspects, there is provided the subject matter of the independent claims. Some further aspects are defined in the dependent claims.

BRIEF DESCRIPTION OF THE DRAWINGS

Some example embodiments will now be described with reference to the accompanying drawings.

FIGS. 6A and 6B are a table illustrating an example embodiment of an offset between each of the synchronization raster points and the channel raster points used by the UE apparatus for a 3 MHz channel bandwidth, according to one illustrated aspect of the disclosure;

FIGS. 7A and 7B are a table illustrating an example embodiment of the offset between each of the synchronization raster points and the channel raster points used by the UE apparatus for a 3 MHz bandwidth, for a second range for a first example embodiment, according to one illustrated aspect of the disclosure;

FIGS. 8A and 8B are a table illustrating an example embodiment of the offset between shifted synchronization raster points and the channel raster points used by the UE apparatus for a 3 MHz bandwidth, for a third range for the first example embodiment, according to one illustrated aspect of the disclosure;

FIG. 9 is a diagram illustrating an example embodiment of a physical broadcast channel (PBCH) puncturing pattern for a 150 KHz frequency offset between synchronization raster points and channel raster points, according to one illustrated aspect of the disclosure;

FIG. 10 is a diagram illustrating an example embodiment of a PBCH puncturing pattern for a −150 KHz frequency offset between synchronization raster points and channel raster points, according to one illustrated aspect of the disclosure;

FIGS. 13A and 13B are a table illustrating an example embodiment of the offset between each of the synchronization raster points and the channel raster points used by the UE apparatus for a 3 MHz bandwidth, for a second range for a second example embodiment, according to one illustrated aspect of the disclosure.

DETAILED DESCRIPTION

In the following description, certain specific details are set forth in order to provide a thorough understanding of disclosed aspects. However, one skilled in the relevant art will recognize that aspects may be practiced without one or more of these specific details or with other methods, components, materials, etc. In other instances, well-known structures associated with transmitters, receivers, or transceivers have not been shown or described in detail to avoid unnecessarily obscuring descriptions of the aspects.

Reference throughout this specification to "one aspect" or "an aspect" means that a particular feature, structure, or characteristic described in connection with the aspect is included in at least one aspect. Thus, the appearances of the phrases "in one aspect" or "in an aspect" in various places throughout this specification are not necessarily all referring to the same aspect. Furthermore, the particular features, structures, or characteristics may be combined in any suitable manner in one or more aspects.

Embodiments described in the present disclosure may be implemented in wireless networking apparatuses, such as, without limitation, apparatuses utilizing Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, enhanced LTE (eLTE), 5G New Radio (5G NR), 5G Advanced, and 802.11ax (Wi-Fi 6), among other wireless networking systems. The term 'eLTE' here denotes the LTE evolution that connects to a 5G core. LTE is also known as evolved UMTS terrestrial radio access (EUTRA) or as evolved UMTS terrestrial radio access network (EUTRAN).

Aspects of the present disclosure relate to initial access procedures. Aspects of the present disclosure provide various advantages, including reducing initial cell search time.

Figure 1:
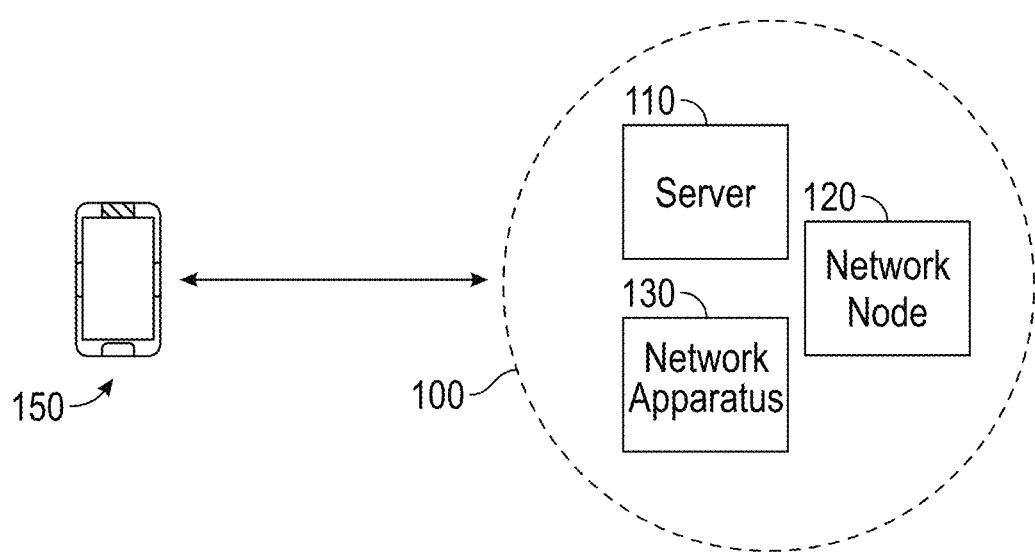
FIG. 1 is a diagram of an example embodiment of wireless networking between a network and a user equipment (UE) apparatus, according to one illustrated aspect of the disclosure.

FIG. 1 is a diagram depicting an example of wireless networking between a network 100 and a user equipment apparatus (UE) 150. The network 100, for example, may include one or more network node apparatuses 120, one or more servers 110, or other networking apparatuses 130 (e.g., test equipment (TE)). Examples of wireless networking apparatuses include, without limitation, apparatuses implementing 5G NR and apparatuses implementing Wi-Fi 6, among others. The present disclosure describes embodiments related to 5G NR and embodiments that involve aspects defined by 3rd Generation Partnership Project (3GPP). With respect to such embodiments, the network node apparatus 120 may be a gNodeB (also known as gNB). However, it is contemplated that embodiments relating to other wireless networking technologies are encompassed within the scope of the present disclosure.

In radio communications, a node may be implemented, at least partly, by a centralized unit, CU, (e.g., server or host), that is operationally coupled to one or more distributed units, DU, (e.g., a radio head). In embodiments, it is possible that node operations may be distributed among multiple centralized units (e.g., servers or hosts). In embodiments, a network node in 5G wireless networking may be implemented based on a so-called CU-DU split. In embodiments, a processing task may be performed in either the CU or the DU, and the shifting of responsibility between the CU and the DU may be configurable according to a particular implementation.

With continuing reference to FIG. 1, in the example of a 5G NR network, the network 100 provides a cell, which defines a coverage area of the network 100. As described above, the network 100 may include a gNB of the 5G NR network or may be any other apparatus configured to control radio communication and manage radio resources within a cell. As used herein, the term "resource" may refer to radio resources, such as a physical resource block (PRB), a radio frame, a subframe, a time slot, a sub-band, a frequency region, a subcarrier, a beam, etc. In embodiments, the network node apparatus 120 may be called a base station.

The UE 150 may include but is not limited to, a smartphone, a tablet, portable computers, vehicle-mounted wireless terminal devices, an Internet of Things (IoT) device, and/or a watch or other wearable device, among others. The network 100 may provide the UE 150 with wireless access to other networks, such as the Internet. The wireless access may include downlink (DL) communication from the network 100 to the UE 150 and uplink (UL) communication from the UE 150 to the network 100. As used herein, the term "transmission" and/or "reception" may refer to, respectively, wirelessly transmitting and/or receiving via a wireless propagation channel on radio resources. There may be other UE in the cell, and each of them may be serviced by the same or by different network node apparatuses, such as network 100.

Figure 3:
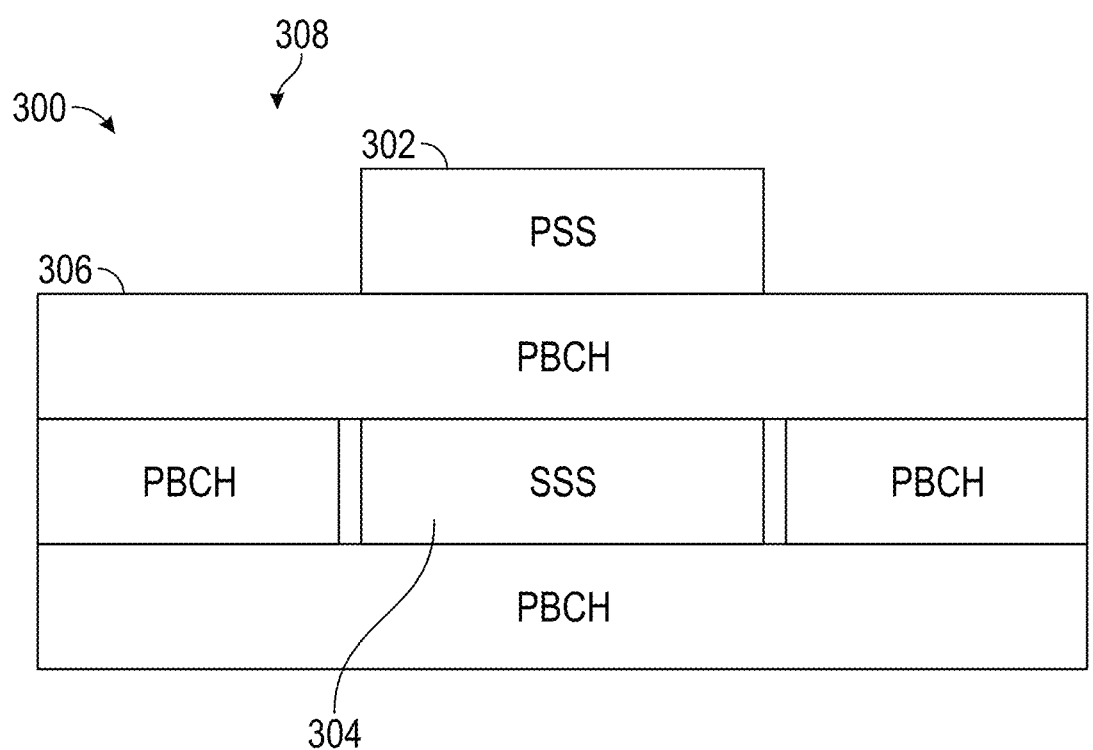
FIG. 3 illustrates a diagram of a Signal Synchronization Block (SSB), according to one illustrated aspect of the disclosure.

During cell search, the UE 150 acquires time and frequency synchronization with a cell and detects the physical layer cell ID (PCI) of the cell. In the example of 5G NR, each beam in a burst transmits information about the beam in what is referred to as a Synchronization Signal Block (SSB) 300 (FIG. 3). For example, a network node 120, which may be a gNodeB, transmits a SSB 300 in each beam in a burst. In embodiments, the UE 150 may receive a burst for each of its receive beams.

Figure 2:
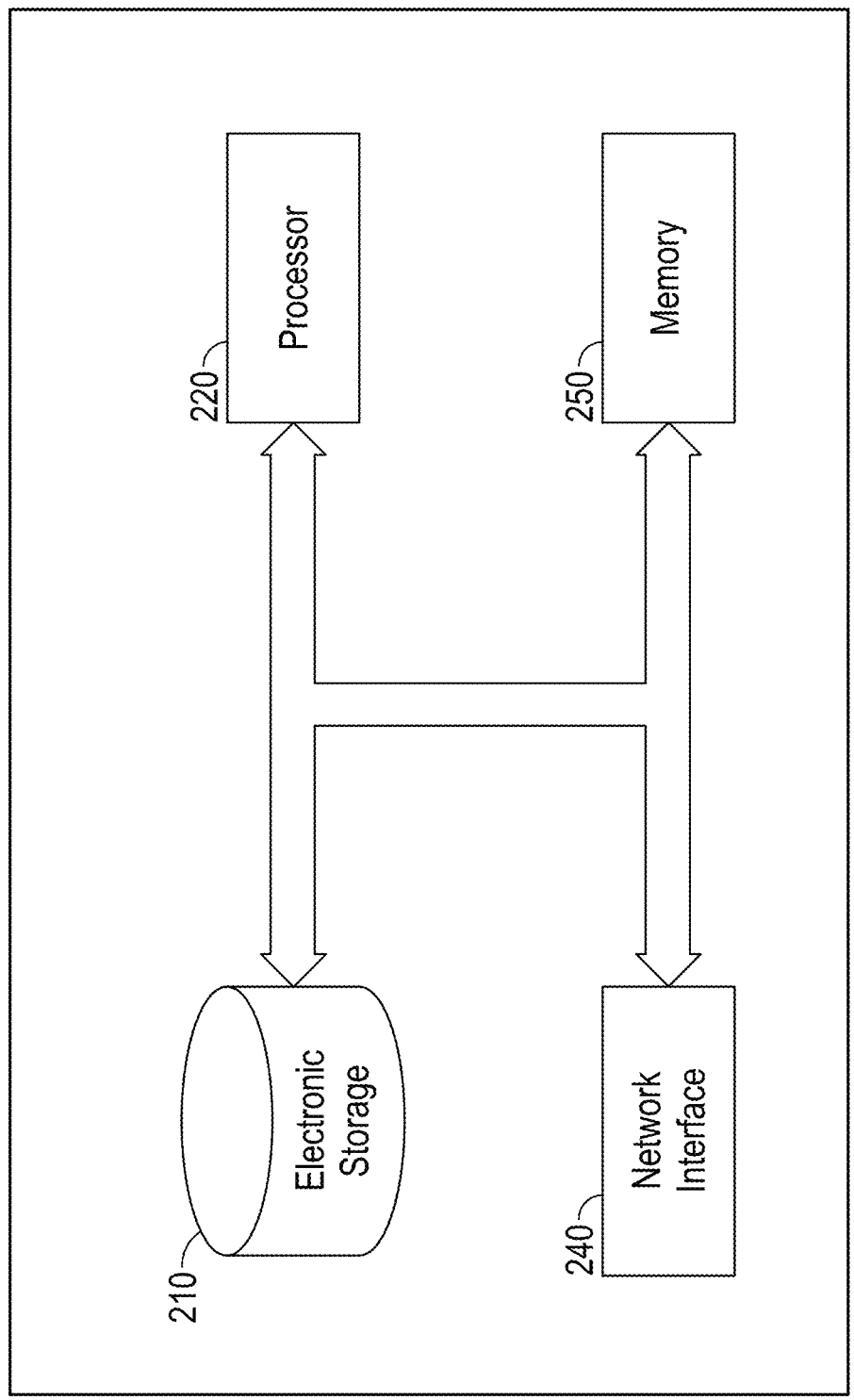
FIG. 2 illustrates an example embodiment of components of a user equipment apparatus or of a network, according to one illustrated aspect of the disclosure.

Referring now to FIG. 2, there is shown a block diagram of example components of a UE or a network apparatus. The apparatus includes an electronic storage 210, a processor 220, a memory 250, and a network interface 240. The various components may be communicatively coupled with each other. The processor 220 may be and may include any type of processor, such as a single-core central processing unit (CPU), a multi-core CPU, a microprocessor, a digital signal processor (DSP), a System-on-Chip (SoC), or any other type of processor. The memory 250 may be a volatile type of memory, e.g., RAM, or a non-volatile type of memory, e.g., NAND flash memory. The memory 250 includes computer-readable instructions that are executable by the processor 220 to cause the apparatus to perform various operations, including the mentioned above.

The electronic storage 210 may be and include any type of electronic storage used for storing data, such as hard disk drive, solid state drive, and/or optical disc, among other types of electronic storage. The electronic storage 210 stores software instructions for causing the apparatus to perform its operations and stores data associated with such operations, such as storing data relating to 5G NR standards, among other data. The network interface 240 may implement wireless networking technologies such as 5G NR, Wi-Fi 6, and/or other wireless networking technologies.

The components shown in FIG. 2 are merely examples, and persons skilled in the art will understand that an apparatus includes other components not illustrated and may include multiples of any of the illustrated components. Such and other embodiments are contemplated to be within the scope of the present disclosure.

Referring to FIG. 3, the SSB 300 is shown. In the example of 5G NR, the SSB 300 includes a primary synchronization signal (PSS) 302, a secondary synchronization signal (SSS) 304, and a Physical Broadcast Channel (PBCH) 306. Synchronization signals may be used by the UE 150 for reference signal received power (RSRP) and reference signal received quality (RSRQ) measurements and for acquiring the time and frequency synchronization.

The UE 150 (FIG. 1) has to decode PSS 302 and SSS 304 to decode time slot information and physical cell id. SSB 300 is transmitted in four OFDM symbols across 240 subcarriers and in pre-defined bursts across the time domain on the configured PRBs. The bursts periodicity in terms of time slots depends on which subcarrier spacing is configured. In 5G NR, based on the frequency band, a set of possible frequency locations on which SSB 300 may be centered are defined, this is called synchronization raster. The UE 150 searches for SSB on the synchronization raster, which is sparser than the channel raster.

The synchronization raster defines the set of frequency positions at which the SSB 300 may be located, when explicit signaling of the SSB position is not present, thereby setting the frequency positions that need to be searched by the UE 150 for the initial cell search. In order to expedite cell search, the synchronization raster is designed in 5G NR to be sparser than the set of frequency positions on which the carrier may be centered, which is known as the channel raster. In frequency range 1 (FR1, defined as 410-7125 MHz), the channel raster typically has a 100 kHz spacing, but the synchronization raster has a cluster of three raster points every 1.2 MHz, with the raster points in each cluster having frequency offsets of either 50, 150 or 250 kHz apart from multiples of 1.2 MHz, as calculated by the following equation: Synchronization raster points=N*1200 kHz+M*50 kHz, N$\in$\{1:2499\}, M$\in$\{1,3,5\}.

The synchronization channel raster spacing $\Delta FSC_{,Raster}$ is constrained as follows: $\Delta FSC_{,Raster} \leq BWConfig - BWPBCH + \Delta FCH_{,Raster}$, where BWConfig (Tx BW configuration) is the width of the transmitted Resource Blocks, BWPBCH is the width of the PBCH, and $\Delta FCH_{,Raster}$ is the channel raster spacing.

In embodiments, in case of fifteen PRBs with 15 kHz subcarrier spacing (SCS) and 100 kHz channel raster spacing is used for 3 MHz bandwidth with the principle of not modifying 12 PRBs for PSS and SSS (i.e., only PBCH is punctured), the clusters of synchronization raster points need to be separated by ≤15*180−12*180+100=640 kHz, in order to have at least one valid synchronization raster point for each 3 MHz channel raster point. The synchronization raster spacing, therefore, will need a redesign for narrowband NR operation as 1.2 MHz is larger than the 640 kHz limit.

As will be described below in connection with a UE operation 400 for establishing access with a network, in embodiments, the synchronization raster can be defined to have a cluster of three raster points in every 600 kHz (where 600 kHz is the largest integer multiple of SCS as well as of channel spacing in FR1 which is smaller than the 640 kHz limit), with the raster points in each cluster having frequency offsets of either 50, 150 or 250 kHz apart from multiples of 600 kHz. Moreover, in embodiments, to prevent a UE that does not support a 3 MHz channel bandwidth from accidentally decoding the punctured PBCH from a 3 MHz cell (and thus causing a delay in initial cell search), the synchronization raster points of the present disclosure, that would overlap with the synchronization raster points defined in 5G NR 3GPP standards for other channel bandwidths, are each shifted by 120 kHz (i.e., by the largest frequency offset which can still keep the 142.5 kHz minimum guard band at each edge of the 3 MHz channel bandwidth) for 3 MHz channel bandwidth deployment.

Figure 4:
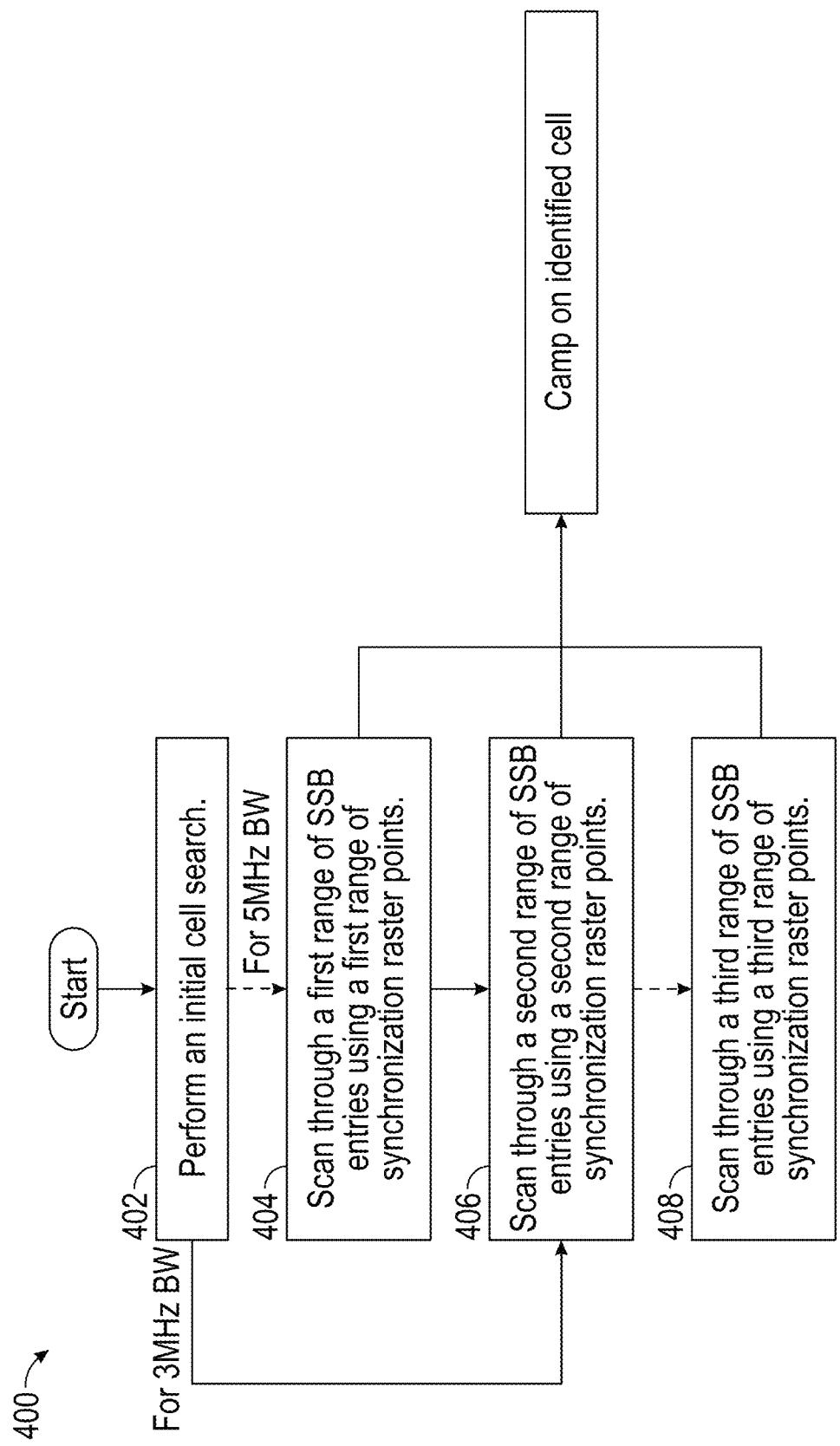
FIG. 4 illustrates an example embodiment of a flow diagram for a user equipment apparatus operation, according to one illustrated aspect of the disclosure.

Referring now to FIG. 4, there is shown a flow diagram of an example of a UE operation 400 for establishing access with a network.

The disclosed technology provides the benefit of reducing the initial cell search time for UEs 150 supporting both 3 MHz and 5 MHz channel bandwidth in at least any 3GPP operating bands specified with 3 MHz bandwidth, such as 5G NR channel bands n100, n8, n26, and n28. Note that the initial cell search time reduction could be more significant for NR bands n8, n26, and n28, which are much wider in the frequency domain and thus have much more channel raster points.

At block 402, the UE operation involves performing an initial cell search to identify one or more cells on a wireless network. Performing the initial cell search includes scanning through a plurality of SSB entries with a synchronization raster.

At block 404, for UE apparatuses that support a 5 MHz channel bandwidth (or both a 3 MHz and a 5 MHz channel bandwidth), the UE operation involves scanning through a first range of SSB entries using a first range of synchronization raster points. The first range of synchronization raster points is given by: (N*1200 kHz)+(M*50 kHz), where values of N range from 1 to 2499, and values of M may be 1, 3, or 5 for each synchronization raster point. In aspects, for synchronization raster points in the first range of the plurality of SSB entries, the UE 150 operation involves applying twenty PRB (240 subcarriers) unpunctured allocations for a PBCH detection.

In aspects, in the case that the UE 150 supports a 3 MHz channel bandwidth (or both a 3 MHz channel bandwidth and a 5 MHz channel bandwidth), the UE operation involves searching synchronization raster points that are 600 kHz and/or 120 kHz higher than the synchronization raster points in the first range of synchronization raster points.

At block 406, the UE operation involves scanning through a second range of SSB entries using a second range of synchronization raster points. The second range of synchronization raster points may be given by: X+(N*1200 kHz)+(M*50 kHz), where values of N range from 1 to 2499, and values of M may be 1, 3, or 5 for each synchronization raster point. In embodiments, X may be a value such as 300 kHz or 600 kHz; however, other values for X are contemplated. For example, the second range of synchronization raster points may be given by: 600 KHz+(N*1200 kHz)+(M*50 kHz).

In aspects, the second range of synchronization raster points may be given by: Y+(N*X)+(M*50 kHz), where values of N range from 2 to 4999 and values of M may be 1, 3, or 5 for each synchronization raster point. In embodiments, X may be a value such as 600 kHz, and Y may be a value such as 120 kHz. Other values for X and Y are contemplated. For example, the second range of synchronization raster points may be given by: 120 kHz+(N*600 kHz)+(M*50 kHz). For example, the range of synchronization raster points to be scanned may start at 120 kHz from an existing synchronization raster point, to avoid overlapping with the existing synchronization raster points valid for a channel bandwidth different than a channel bandwidth supported by the UE 150.

At block 408, the UE operation involves scanning through a third range of SSB entries using a third range of synchronization raster points. The third range of synchronization raster points is given by: Y+(N*1200 kHz)+(M*50 kHz), where values of N range from 1 to 2499, and values of M may be 1, 3, or 5 for each synchronization raster point. In embodiments, Y may be a value such as 120 kHz, though other frequency values for Y are contemplated.

In aspects, in the case that the UE 150 supports both a 3 MHz channel bandwidth and a 5 MHz channel bandwidth, the UE operation involves first searching the first range of synchronization raster points. Next, the UE operation involves determining if an SSB is located in the first range of synchronization raster points. Next, the UE operation involves searching the second range and third range of synchronization raster points based on the determination that the SSB is not located in the first range.

In aspects, in the case that the UE 150 supports both a 3 MHz channel bandwidth and a 5 MHz channel bandwidth, the UE operation involves searching the first range of synchronization raster points and the second and third ranges of synchronization raster points together with ascending or descending order in a frequency domain.

In aspects, for synchronization raster points in the second range or third range of the plurality of SSB entries, the UE operation involves applying a plurality of PRB allocations for one or more puncturing patterns, which will be described in more detail in connection with FIGS. 9-12.

In aspects, the UE 150 may camp on the identified cell. "Camping on" is the UE apparatus state in which the UE apparatus stays on a cell and is ready to initiate a potential dedicated service or to receive an ongoing broadcast service.

Figure 5:
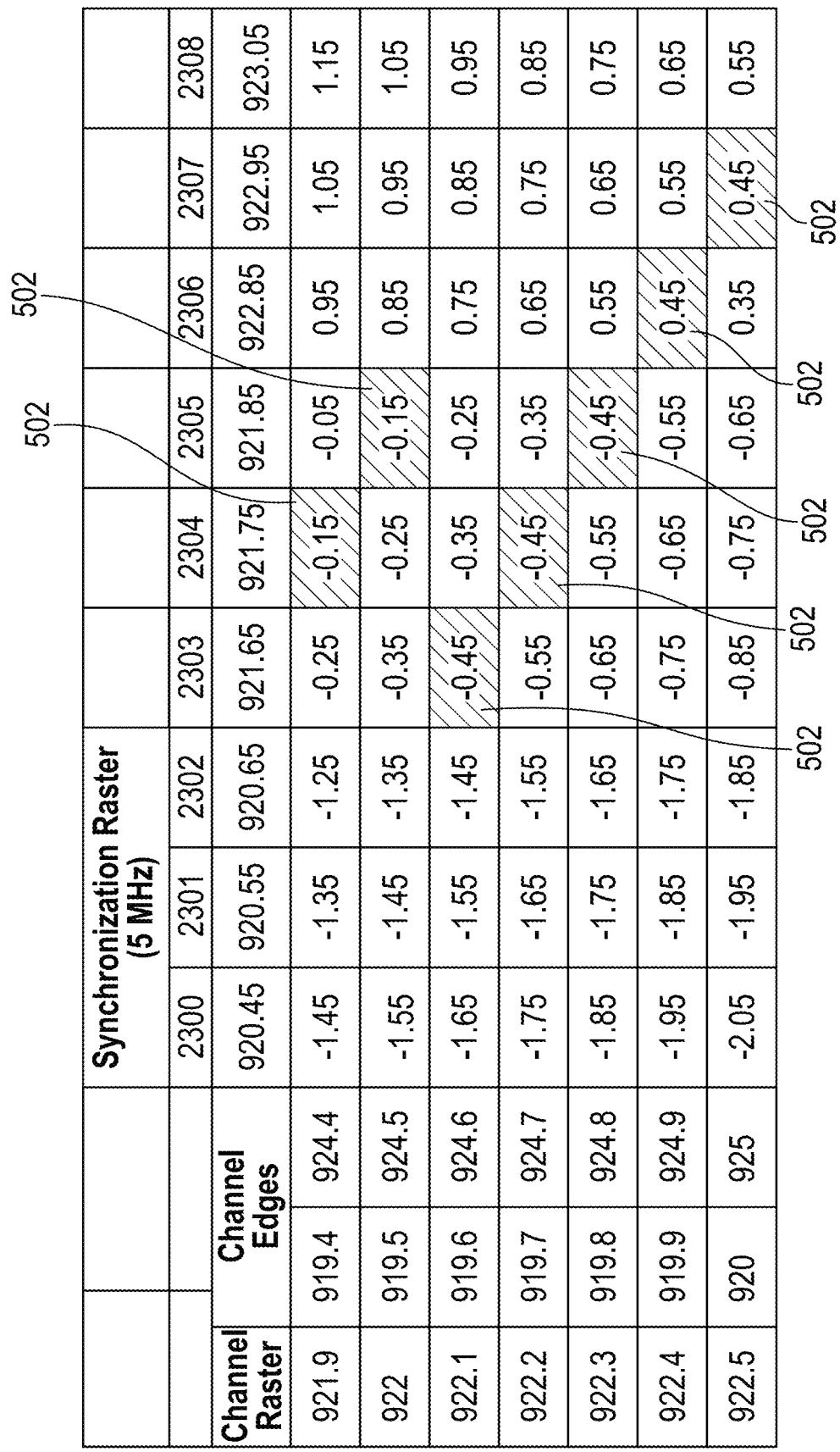
FIG. 5 is a table illustrating an example embodiment of an offset between each of the synchronization raster points and the channel raster points used by the UE apparatus for a 5 MHz channel bandwidth, according to one illustrated aspect of the disclosure.

FIG. 5 is a table illustrating an example embodiment of an offset between each of the synchronization raster points and the channel raster points used by the UE apparatus for a 5 MHz channel bandwidth for 5G NR band n100. Although band n100 is used as an example, other bands, such as n8, n26, and n28, are contemplated.

The illustrated synchronization raster points 502 for each channel raster point are the only valid synchronization raster points because their offset (from the channel raster point) must be a multiple of the 15 kHz SCS, and the 242.5 kHz minimum guard band must be kept at each edge of the 5 MHz channel bandwidth, which means the absolute value of the offset ($\Delta F_{SC,Raster}$) must be ≤(5−3.6)/2−0.2425=0.4575 MHz.

Referring to FIGS. 6A-8B, offsets between synchronization raster points and channel raster points are shown for a 3 MHz channel bandwidth for 5G NR band n100. Although band n100 is used as an example, any other bands specified with 3 MHz channel bandwidth, such as n8, n26, and n28, are contemplated.

In embodiments, for a synchronization raster having a cluster of three raster points every 1.2 MHz, used for 3 MHz channel bandwidth with 90% spectrum utilization (fifteen PRBs), the offsets between each synchronization raster point and channel raster point pair are provided in FIGS. 6A and 6B, showing the valid synchronization raster points 602. It can be seen in FIGS. 6A and 6B that there is no valid synchronization raster point for more than half (15/27) of the channel raster points, considering the offset must be a multiple of the 15 kHz SCS and the 142.5 kHz minimum guard band must be kept at each edge of the 3 MHz channel bandwidth. Thus, the absolute value of the offset ($\Delta F_{SC,Raster}$) must be ≤(3−2.16)/2−0.1425=0.2775 MHz.

In embodiments, for a synchronization raster having a cluster of three raster positions every 600 kHz, used for 3 MHz channel bandwidth with approximately 90% spectrum utilization (15 PRBs), the offsets between each new and shifted synchronization raster point (i.e., existing ones are not repeated) and channel raster point pair are provided in FIGS. 7A, 7B, 8A, and 8B, respectively, with the valid synchronization raster points highlighted in green. It can be seen in FIGS. 7A, 7B, 8A, and 8B that there is one valid synchronization raster point 702, 802, for each of the 15 channel raster points that do not have a valid synchronization raster point in FIGS. 6A and 6B.

Most (i.e., 12 out of the 15) of the valid synchronization raster points in FIGS. 7A, 7B, 8A, and 8B are mapped to two channel raster points, each with a different offset between the synchronization raster point and the channel raster point. Therefore, two PBCH puncturing patterns for a given SSB Tx BW configuration may be defined for each synchronization raster point, one PBCH puncturing pattern for each of the channel raster points to fit the 12 PRBs PSS/SSS within the 3 MHz channel bandwidth. PBCH puncturing patterns for the 270 kHz, 150 kHz, −30 kHz, and −150 kHz offsets between the synchronization raster point and channel raster point are shown in FIGS. 9-12 below. Generally, only one or two PBCH puncturing patterns are relevant for a given synchronization raster point.

FIGS. 9-12 are diagrams illustrating example embodiments of PBCH puncturing patterns 920, 1020, 1120, and 1220, for various frequency offsets between synchronization raster points 904 and channel raster points 902. Box 910 represents a fifteen PRB bandwidth. Puncturing at the receiver is the discarding of the punctured PBCH subcarriers at the reception or detection of PBCH. Correspondingly, puncturing at the transmitter is not generating or nulling the PBCH signal transmitted on the punctured subcarriers. Note that PSS 302 and SSS 304 are not discarded by the PBCH puncturing pattern 920. The puncturing patterns are generally determined by the actual channel deployment of the network 100. For example, if there is high interference at −150 kHz offset, then a puncturing pattern of 150 kHz offset may be chosen.

Figure 11:
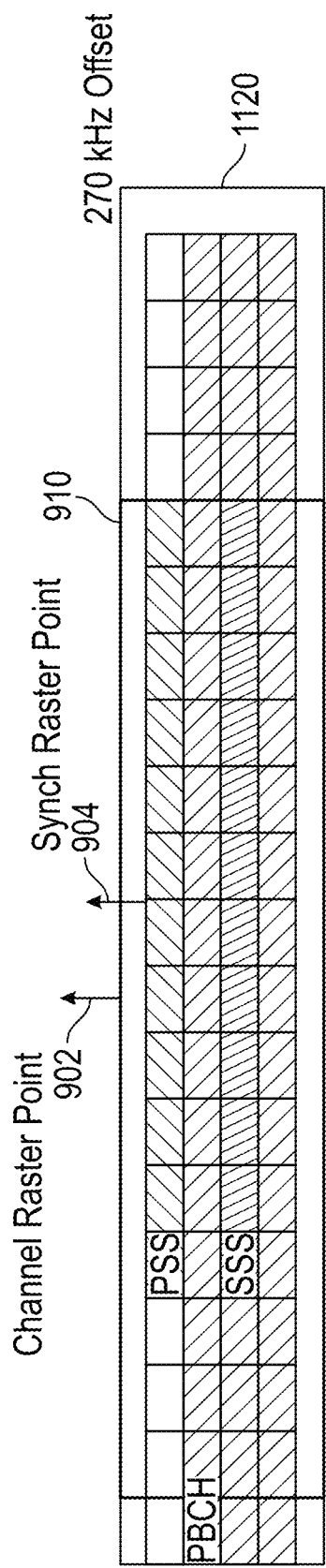
FIG. 11 is a diagram illustrating an example embodiment of a PBCH puncturing pattern for a 270 KHz frequency offset between synchronization raster points and channel raster points, according to one illustrated aspect of the disclosure.
Figure 12:
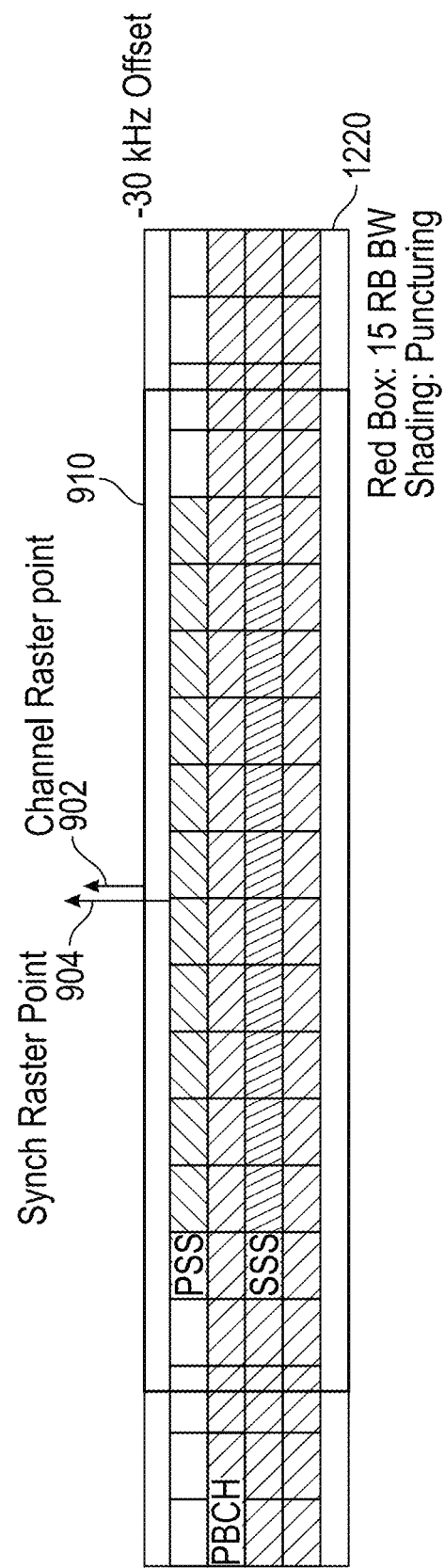
FIG. 12 is a diagram illustrating an example embodiment of a PBCH puncturing pattern for a −30 KHz frequency offset between synchronization raster points and channel raster points, according to one illustrated aspect of the disclosure.

Referring to FIG. 9, the PBCH puncturing pattern 920 for a 150 KHz frequency offset between synchronization raster points 904 and channel raster points 902 is shown. FIG. 10 illustrates the PBCH puncturing pattern 1020 for a −150 KHz frequency offset between synchronization raster points 904 and channel raster points 902. FIG. 11 illustrates the PBCH puncturing pattern 1120 for a 270 KHz frequency offset between synchronization raster points 904 and channel raster points 902. Referring to FIG. 12, the PBCH puncturing pattern 1220 for a −30 KHz frequency offset between synchronization raster points 904 and channel raster points 902 is shown.

Referring to FIGS. 13A and 13B, a table illustrating an example embodiment of the offset between each of the synchronization raster points and the channel raster points used by the UE apparatus for a 3 MHz bandwidth for 5G NR band n100, for a second range for a second exemplary embodiment is shown. Although band n100 is used as an example, other bands, such as n8, n26, and/or n28, are contemplated.

The offsets between each synchronization raster point (of the second range) and channel raster point pair are provided in FIGS. 13A and 13B, showing the valid synchronization raster points 1302. FIGS. 13A and 13B show that there is one valid synchronization raster point for each channel raster point on band n100 for 3 MHz channel bandwidth. It is also notable that only two PBCH puncturing patterns are needed as the synchronization raster point/channel raster point offsets are limited to 270 kHz and −30 kHz offsets.

Further embodiments of the present disclosure include the following examples.

Example 1. A user equipment apparatus comprising:
  means for performing an initial cell search of one or more cells on a network, wherein performing the initial cell search includes scanning through a plurality of SSB entries with a synchronization raster, and
  wherein the synchronization raster includes a cluster of three synchronization raster points positioned every 600 kHz.

Example 2. The apparatus of Example 1, wherein the synchronization raster points in each cluster include frequency offsets from each other of at least one of 50 kHz, 150 kHz, or 250 kHz, apart from the 600 kHz.

Example 3. The apparatus of any one of the preceding Examples, wherein a range of synchronization raster points to be scanned starts at 120 kHz from an existing synchronization raster point to avoid overlapping with existing synchronization raster points valid for other existing channel bandwidth.

Example 4. The apparatus of any one of the preceding Examples, wherein, in the case that the user equipment apparatus supports both a 3 MHz channel bandwidth and a 5 MHz channel bandwidth, further comprising means for scanning through a first range of the plurality of SSB entries, where a first range of synchronization raster points is given by:
  (N*1200 kHz)+(M*50 kHz),
  scanning through a second range of the plurality of SSB entries, where a second range of synchronization raster points is given by:
  600 KHz+(N*1200 kHz)+(M*50 kHz), and
  scanning through a third range of the plurality of SSB entries, where a third range of synchronization raster points is given by:
  120 KHz+(N*1200 kHz)+(M*50 kHz),
  wherein the values of N range from 1 to 2499, and
  wherein the values of M are 1, 3, and 5.

Example 5. The apparatus of Example 1, in the case that the user equipment apparatus supports a 3 MHz channel bandwidth, further comprising means for scanning through a second range of the plurality of SSB entries, where a second range of synchronization raster points is given by:
  600 kHz+(N*1200 kHz)+(M*50 kHz), and
  scan through a third range of the plurality of SSB entries, where a third range of synchronization raster points is given by:
  120 KHz+(N*1200 kHz)+(M*50 kHz),
  wherein the values of N range from 1 to 2499, and
  wherein the values of M are 1, 3, and 5.

Example 6. The apparatus of Example 5, wherein, for synchronization raster points in the first range of the plurality of SSB entries, further comprising means for applying twenty physical resource block unpunctured allocations for a physical broadcast channel detection.

Example 7. The apparatus of Example 5, wherein for synchronization raster points in the second range or third range of the plurality of SSB entries, further comprising means for applying a plurality of PRB allocations for one or more puncturing patterns.

Example 8. The apparatus of any one of the preceding Examples, wherein, in the case that the user equipment apparatus supports both a 3 MHz channel bandwidth and a 5 MHz channel bandwidth, further comprising means for:
  searching the synchronization raster points which are 600 kHz and 120 kHz higher than the synchronization raster points in the first range of synchronization raster points.

Example 9. The apparatus of any one of the preceding Examples, wherein, in the case that the user equipment apparatus supports both a 3 MHz channel bandwidth and a 5 MHz channel bandwidth, further comprising means for:
  searching the first range of synchronization raster points for the SSB;
  determining if the SSB is within the first range of synchronization raster points; and
  searching the second range and third ranges of synchronization raster points based on the determination that the SSB is not located in the first range.

Example 10. The apparatus of any one of the preceding Examples, wherein, in the case that the user equipment apparatus supports both a 3 MHz channel bandwidth and a 5 MHz channel bandwidth, further comprising means for:
  searching the first range of synchronization raster points and the second and third ranges of synchronization raster points together with an ascending order or a descending order in a frequency domain.

Example 11. The apparatus of any one of the preceding Examples, in the case that the user equipment apparatus supports a 3 MHz channel bandwidth, further comprising means for:
  scanning through a second range of the plurality of SSB entries, where a second range of synchronization raster points is given by:
  120 KHz+(N*600 kHz)+(M*50 kHz),
  wherein for the second range the values of N range from 2 to 4999, and
  wherein the values of M are 1, 3, and 5.

The embodiments and aspects disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different aspects in accordance with this disclosure. The phrase "a plurality of" may refer to two or more.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

While aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed is:

1. A user equipment apparatus, comprising:
   at least one processor; and
   at least one memory storing instructions which, when executed by the at least one processor, cause the user equipment apparatus at least to:
   perform an initial cell search of one or more cells on a network, wherein performing the initial cell search includes scanning through a plurality of SSB entries with a synchronization raster, and
   wherein the synchronization raster includes a cluster of three synchronization raster points positioned every 600 kHz, and wherein, in case that the user equipment apparatus supports both a 3 MHz channel bandwidth and a 5 MHz channel bandwidth, the instructions, when executed by the at least one processor, further cause the user equipment apparatus to:
   scan through a first range of the plurality of SSB entries, where a first range of synchronization raster points is given by:
   (N*1200 kHz)+(M*50 kHz),
   scan through a second range of the plurality of SSB entries, where a second range of synchronization raster points is given by:
   600 kHz+(N*1200 kHz)+(M*50 kHz), and
   scan through a third range of the plurality of SSB entries, where a third range of synchronization raster points is given by:
   120 kHz+(N*1200 kHz)+(M*50 kHz),
   wherein values of N range from 1 to 2499, and
   wherein values of M are 1, 3, and 5.

2. The user equipment apparatus of claim 1, wherein the synchronization raster points in each cluster include frequency offsets of at least one of 50 kHz, 150 kHz, or 250 kHz.

3. The user equipment apparatus of claim 1, wherein a range of synchronization raster points to be scanned starts at 120 kHz from an existing synchronization raster point to avoid overlapping with existing synchronization raster points valid for other existing channel bandwidth.

4. The user equipment apparatus of claim 1, wherein, in case that the user equipment apparatus supports a 3 MHz channel bandwidth, the instructions, when executed by the at least one processor, further cause the user equipment apparatus to:
   scan through a second range of the plurality of SSB entries, where a second range of synchronization raster points is given by:
   600 kHz+(N*1200 kHz)+(M*50 kHz), and
   scan through a third range of the plurality of SSB entries, where a third range of synchronization raster points is given by:
   120 kHz+(N*1200 kHz)+(M*50 kHz),
   wherein values of N range from 1 to 2499, and
   wherein values of M are 1, 3, and 5.

5. The user equipment apparatus of claim 1, wherein, for synchronization raster points in the first range of the plurality of SSB entries, the instructions, when executed by the at least one processor, further cause the user equipment apparatus to:
   apply twenty physical resource block (PRB) unpunctured allocations for a physical broadcast channel (PBCH) detection.

6. The user equipment apparatus of claim 4, wherein for synchronization raster points in the second range or third range of the plurality of SSB entries, the instructions, when executed by the at least one processor, further cause the user equipment apparatus to:
   apply a plurality of PRB allocations for one or more puncturing patterns.

7. The user equipment apparatus of claim 1, wherein, in case that the user equipment apparatus supports both a 3 MHz channel bandwidth and a 5 MHz channel bandwidth, the instructions when executed by the at least one processor, further cause the user equipment apparatus to:
   search the synchronization raster points which are 600 kHz and 120 kHz higher than the synchronization raster points in a first range of synchronization raster points.

8. The user equipment apparatus of claim 1, wherein, in case that the user equipment apparatus supports both a 3 MHz channel bandwidth and a 5 MHz channel bandwidth, the instructions when executed by the at least one processor, further cause the user equipment apparatus to:
   search the first range of synchronization raster points for the SSB;
   determine if the SSB is within the first range of synchronization raster points; and
   search the second range and third ranges of synchronization raster points based on the determination that the SSB is not located in the first range.

9. The user equipment apparatus of claim 1, wherein, in case that the user equipment apparatus supports both a 3 MHz channel bandwidth and a 5 MHz channel bandwidth, the instructions, when executed by the at least one processor, further cause the user equipment apparatus to:
   search the first range of synchronization raster points and the second and third ranges of synchronization raster points together with an ascending order or a descending order in a frequency domain.

10. The user equipment apparatus of claim 1, wherein, in case that the user equipment apparatus supports a 3 MHz channel bandwidth, the instructions, when executed by the at least one processor, further cause the user equipment apparatus to:

scan through a second range of the plurality of SSB entries, where a second range of synchronization raster points is given by:

120 kHz+(N*600 kHz)+(M*50 kHz), wherein for the second range values of N range from 2 to 4999, and wherein the values of M are 1, 3, and 5.

11. A method in a user equipment apparatus, the method comprising:

performing an initial cell search of one or more cells on a network, wherein performing the initial cell search includes scanning through a plurality of SSB entries with a synchronization raster, and wherein the synchronization raster includes a cluster of three synchronization raster points positioned every 600 kHz, wherein in case that the user equipment apparatus supports both a 3 MHz channel bandwidth and a 5 MHz channel bandwidth, the scanning includes:

scanning through a first range of the plurality of SSB entries, where a first range of synchronization raster points is given by:

(N*1200 kHz)+(M*50 kHz), scanning through a second range of the plurality of SSB entries, where a second range of synchronization raster points is given by:

600 kHz+(N*1200 kHz)+(M*50 kHz), scanning through a third range of the plurality of SSB entries, where a third range of synchronization raster points is given by:

120 KHz+(N*1200 kHz)+(M*50 kHz), wherein values of N range from 1 to 2499, and wherein values of M are 1, 3, and 5.

12. The method of claim 11, wherein the synchronization raster points include frequency offsets of at least one of 50 kHz, 150 kHz, or 250 kHz.

13. The method of claim 11, wherein a range of synchronization raster points to be scanned starts at 120 kHz from an existing synchronization raster point to avoid overlapping with existing synchronization raster points valid for other existing channel bandwidth.

14. The method of claim 11, wherein, in case that the user equipment apparatus supports a 3 MHz channel bandwidth, the scanning includes:

scanning through a second range of the plurality of SSB entries, where a second range of synchronization raster points is given by:

600 kHz+(N*1200 kHz)+(M*50 kHz), scanning through a third range of the plurality of SSB entries, where a third range of synchronization raster points is given by:

120 kHz+(N*1200 kHz)+(M*50 kHz), wherein the values of N range from 1 to 2499, and wherein the values of M are 1, 3, and 5.

15. The method of claim 11, wherein, in case that the user equipment apparatus supports a 3 MHz channel bandwidth, the scanning includes:

scanning through a second range of the plurality of SSB entries, where a second range of synchronization raster points is given by:

120 kHz+(N*600 kHz)+(M*50 kHz), wherein for the second range values of N range from 2 to 4999, and wherein the values of M are 1, 3, and 5.

* * * * *